United States Patent [19]

Coppola et al.

[11] Patent Number: 4,574,352

[45] Date of Patent: Mar. 4, 1986

[54] DROP SHIPMENT MAILING SYSTEM

[75] Inventors: Vincent G. Coppola, Branford; John L. Lorenzo, Southbury; Edwin G. Grisgraber, Shelton; Flavio M. Manduley, Woodbury, all of Conn.

[73] Assignee: Pitney Bowes Inc., Stamford, Conn.

[21] Appl. No.: 472,521

[22] Filed: Mar. 7, 1983

[51] Int. Cl.$^4$ .................................... G01G 19/40
[52] U.S. Cl. ................................ 364/466; 364/200
[58] Field of Search ........... 364/466, 467, 200, 900, 364/464, 478; 177/25, 4

[56] References Cited

U.S. PATENT DOCUMENTS

| | | | |
|---|---|---|---|
| 4,271,470 | 6/1981 | Dlugos et al. | 364/200 |
| 4,308,579 | 12/1981 | Dlugos | 364/200 |
| 4,351,033 | 9/1982 | Uchimura et al. | 364/466 |
| 4,410,961 | 10/1983 | Dlugos et al. | 364/466 |
| 4,410,962 | 10/1983 | Daniels et al. | 364/466 |
| 4,430,716 | 2/1984 | Dlugos et al. | 364/466 |

Primary Examiner—Parshotam S. Lall
Attorney, Agent, or Firm—Robert H. Whisker; David E. Pitchenik; William D. Soltow, Jr.

[57] ABSTRACT

An automated mailing system includes a scale having a weighing device, a keyboard for entering postage value determining data, a postage value determining processor and a programmable read only memory containing postal rate and zip to zone conversion data. A peripheral controller interface provides communication capability between the scale processor and a plurality of peripheral mailing devices including a series of electronic postage meters each of which is adapted to provide postage value denominations for mail originating from different postal zone distribution points. A data steering interface, which may be included within the peripheral controller interface, provides interconnection between the communications lines received from the scale system processor and the communication lines of the respective electronic postage meters. A selector switch provides selection signals to the data steering interface for directing the interface to establish communication links between the scale processor through the peripheral interface controller and a desired one of the electronic postage meters.

10 Claims, 10 Drawing Figures

| FIG. 2A | FIG. 2B |
|---|---|
| FIG. 2C | FIG. 2D |
| FIG. 2E | FIG. 2F |
| FIG. 2G | FIG. 2H |

FIG. 2

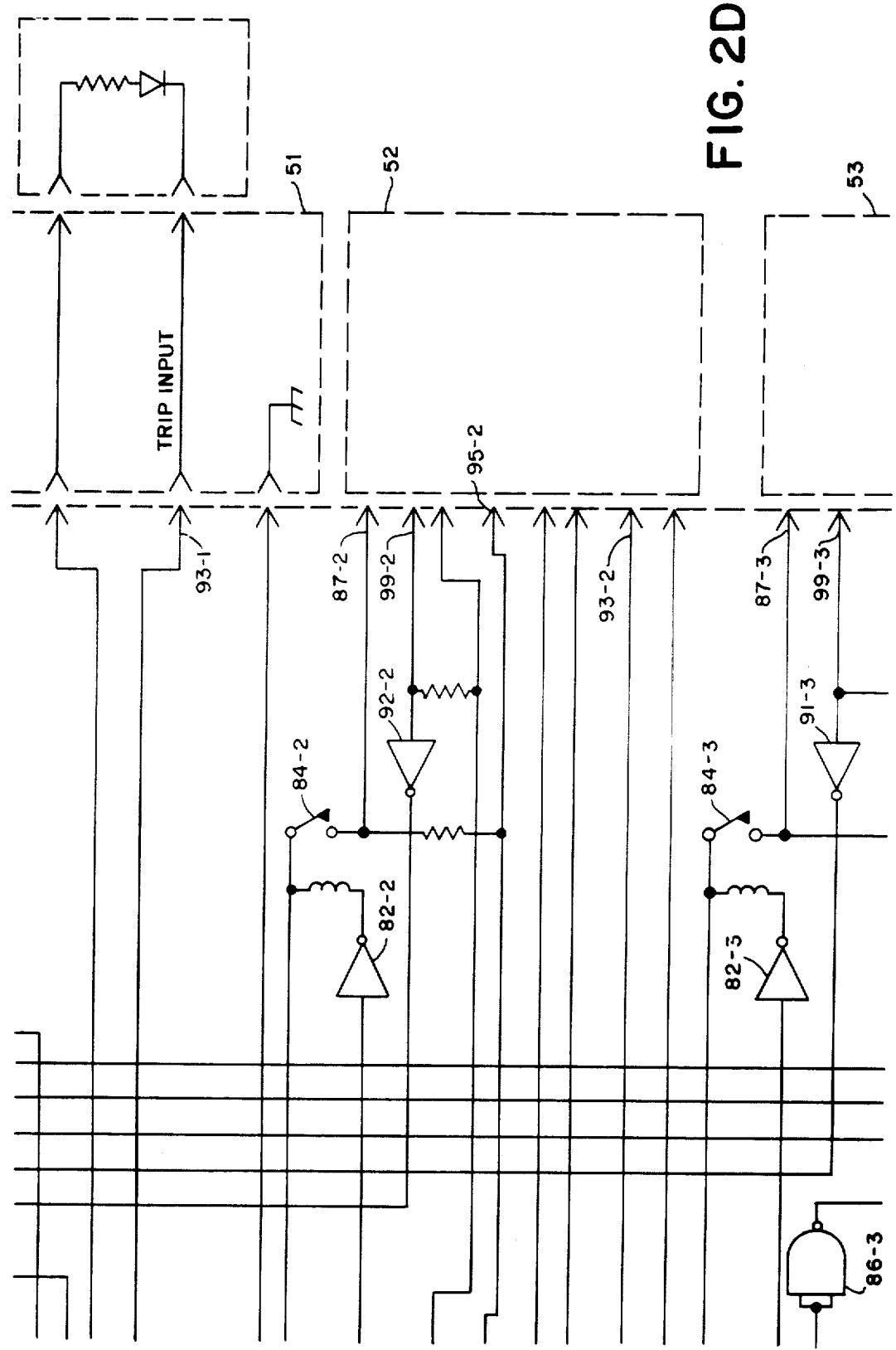

DROP SHIPMENT MAILING SYSTEM

RELATED APPLICATION

This application is related to copending application Ser. No. 472,522 filed on even date herewith in the names of V. Coppola, J. Lorenzo, E. Grisgraber, F. Manduley and E. Daniels entitled "Improved Meter Selection for Drop Shipment Mailing System" and assigned to the assignee of this invention.

BACKGROUND OF THE INVENTION

This invention relates generally to mailing systems and more particularly to a parcel mailing system including a weighing scale adapted to weigh an article and determine the appropriate postage denomination to be affixed to the parcel. The system includes a data steering interface connected between a peripheral controller interface and a plurality of peripheral electronic postage meters each adapted to provide the postage due based on mailing parcels from a different mail distribution point.

A problem encountered by large volume parcel mail users whose business includes distributing parcels to different locations throughout the United States from a single location is to employ the least expensive combination of private carrier such as truck and rail shipment, United Parcel Service (UPS) and the U.S. Postal Service (USPS). Frequently, the least expensive method involves a multiple carrier "drop shipment" solution whereby a number of parcels are shipped in bulk by truck or rail freight to a central distribution point for deposit for mailing through the USPS parcel service.

For example, a large volume mailer located in New York City having a large number of parcels to be distributed to different addresses within several different postal mailing zones may find it advantageous to bulk ship groups of parcels having addresses within a particular zone to the central distribution point such as Chicago, Los Angeles, etc., for that particular zone for insertion into the USPS system. Accordingly, each parcel of the bulk shipment will require a postage denomination attached to the individual parcels representing the postage value and mail origin indicia based on being mailed from the central zone distribution point to the individual parcel address rather than from the point where the postage is affixed, in this case, New York City. Since the postal rate charts and zip number to zone number conversion charts stored in the mailing system programmable read only memory (PROM) are based on the rates from a single mailing point, multiple mailing systems would be required in the above-noted circumstance. Duplicating the scale and meter mailing system for each distribution point would involve substantial expense. Accordingly, the present invention includes a data steering interface connected to a plurality of individual electronic postage meters, each of which is adapted to provide the postage meter denomination based on mailing from a different zone distribution point. The data steering interface is also connected to a peripheral interface controller which is connected to the postage value determining system processor within the scale.

In U.S. Pat. No. 4,308,579 in the name of Daniel F. Dlugos entitled MULTIPROCESSOR PARCEL POSTAGE METERING SYSTEM HAVING SERIAL DATA BUS, issued Dec. 29, 1981 and assigned to the assignee of the present invention, a postage calculating system having a serial communications controller for communications between the system processor and peripheral devices was disclosed. The system included a serial communications bus through which the peripheral devices communicated with the system processor. Some peripherals were interconnected to the serial communications bus by a separate peripheral controller, while a meter setting device was directly linked to the serial communications bus. Appropriate signals were transmitted along an attention line when it was desired to select a peripheral which would receive or transmit via the shared communications bus. Acknowledgement lines were also provided to acknowledge receipt of signals. The serial communications controller comprised an integral part of the main postage calculator system circuit board.

Since the serial controller was an integral part of the main scale system circuit board, a purchaser who only wished to acquire a postage scale and not the peripheral devices or not all of the available peripherals was at a disadvantage. In addition, if a malfunction arose, the serial communications controller and the communications bus were not serviceable as a single unit on a separate board. The sharing of a common communications bus by all peripheral devices made the replacement or substitution of different peripheral devices a formidable task which required reprogramming.

A serial communications system between a postage meter control unit and a plurality of external devices was disclosed in U.S. Pat. No. 4,301,507 in the name of John H. Soderberg et al entitled ELECTRONIC POSTAGE METER HAVING PLURAL COMPUTING SYSTEMS issued Nov. 17, 1981 and assigned to assignee of the present invention. The communications protocol procedure disclosed in the above patent related to the serial transmission of data and bit by bit return of such data to the transmitter for verification. Also disclosed was a system comprising a daisy chain between the plurality of external devices and control unit.

In U.S. Pat. No. 4,271,470 entitled SERIAL DATA BUS FOR USE IN A MULTIPROCESSOR PARCEL POSTAGE METERING SYSTEM issued June 2, 1981 in the name of Daniel F. Dlugos et al and assigned to the assignee of the present invention, there is disclosed a mailing system having a scale system processor and subsystem or peripheral processors communicating with peripheral mailing devices. Also disclosed were control routines for transferring data and commands within the system.

In U.S. Pat. No. 4,410,961 of Daniel F. Dlugos et al entitled INTERFACE BETWEEN A PROCESSOR SYSTEM AND PERIPHERAL DEVICES USED IN A MAILING SYSTEM Ser. No. 235,241 filed Feb. 17, 1981 and assigned to the assignee of the present invention issued Oct. 18, 1983 as U.S. Pat. No. 4,410,961, there is disclosed a peripheral controller interface board establishing a communications link between a postage value determining system processor associated with a postage scale and a plurality of peripheral devices. The interface includes a controller or microcomputer which receives data and command signals from the system processor. A multiplexer interconnects the peripheral transmit line of the controller with a selected peripheral device, while a further multiplexer interconnects the peripheral receive line of the controller with the selected peripheral device. Typical mailing system peripheral devices include electronic postage meters, an electronic accounting system, a scale computer interface and a printer. In response to command signals from the system processor, the microcomputer establishes a communications link with a selected peripheral device. The capacity of this system is limited as to the number of peripheral electronic postage meters which can be included within the system.

SUMMARY OF THE INVENTION

A parcel mailing system includes a scale having a parcel weighing device, a keyboard for entering postage value determining data, a postage value determining processor, one or more programmable read only memories containing postal rate data and zip number to zone conversion data and a display for displaying data entered through the keyboard as well as calculated postage values. The scale is capable of operating as a stand alone mailing system and also includes output lines for establishing a communications link with peripheral mailing devices.

A separate peripheral controller interface provides communications capability between the postage value determining processor contained within the scale and a selected one or ones of the peripheral devices. Included within the peripheral mailing devices is a series of electronic postage meters, each of which is adapted to provide postage value denominations including indicia based on mail originating from different postal zone distribution points. A data steering interface, which may be included within the peripheral controller interface unit, provides interconnection between the peripheral controller interface data communications lines and the data communication lines of the respective one of the electronic postage meters desired based on the zone distribution point selected. A selector switch provides selection signals to the data steering interface board for directing the interface board to establish communications links between the scale system processor through the controller interface and the desired one of the electronic postage meters. The peripheral controller interface may also have interconnected thereto peripherals such as an electronic accounting system, a scale computer interface, a printer and/or an RS 232 communications link to a printer. When the mailing system operator has a parcel or parcels which it is desired to bulk ship to a particular distribution point within a zone, a particular electronic postage meter having indicia for the particular distribution point, and having access to the rate data and zip number to zone number conversion data for that zone, is selected through the selection switch. The selection switch directs the data steering interface board to interconnect the scale system processor through the controller interface with the desired electronic postage meter which contains the desired mail origin postal denomination indicia. When the parcel is weighed and the appropriate data entered through the keyboard, the postage value determined based on mailing from the desired distribution point is computed and printed for affixing to the parcel.

From the foregoing description, it will be understood that it is an object of this invention to provide a parcel mailing system which permits determining and affixing at a single location the postage denomination for parcels based on the rates for mailing from different remote individual distribution points.

A further object is to provide such a mailing system in a lower cost configuration which obviates the need for duplicating an entire mailing system for each desired postal zone distribution point.

A further object of the invention is to provide a data steering interface of the general character described between a postage determining processor interface and a desired one of a group of electronic postage meters, each of which contains access to the postage rate data based on mailing from a respective one of a desired group of zones.

Other objects and advantages of the present invention will become apparent upon reading the following detailed description considered in conjunction with the preferred embodiment of the invention illustrated in the attached drawings.

While the present invention will be described in connection with a preferred embodiment thereof, it will be understood that it is not intended to limit the invention to that embodiment only. On the contrary, it is intended to cover all alternatives, modifications and equivalents as may be reasonably included within the sphere and scope of the invention as defined by the appended claims.

BRIEF DESCRIPTION OF THE DRAWINGS

In the accompanying drawings, in which is shown one of the various possible exemplary embodiments of the invention.

DESCRIPTION OF THE PREFERRED EMBODIMENT

Figure 1:
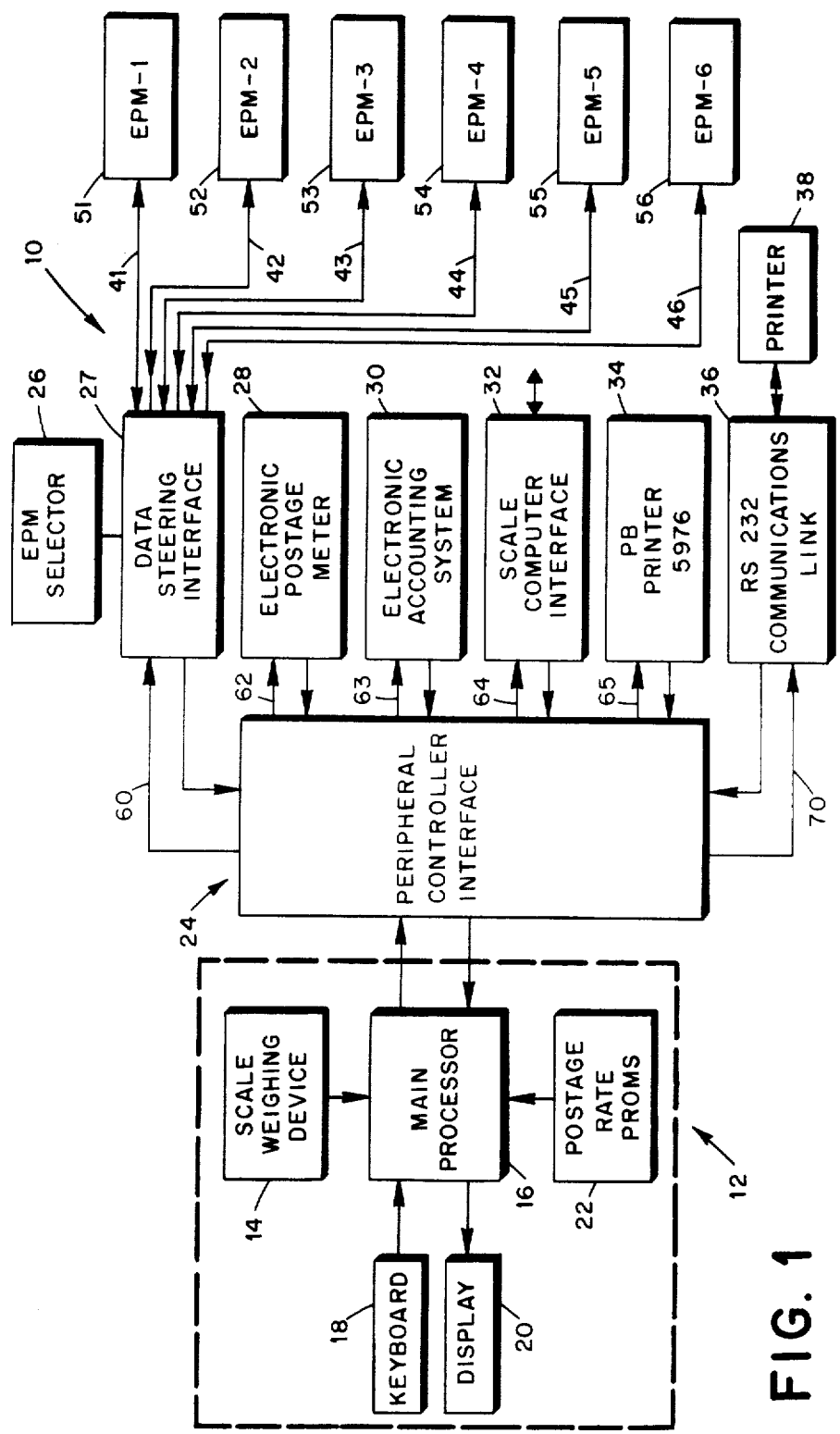
FIG. 1 is a schematic block diagram of a typical mailing system illustrating the arrangement of the scale, peripheral controller interface, data steering interface and peripheral electronic postage meters.

Referring now to the drawings, reference numeral 10 denotes generally an automated parcel mailing system including a processor controlled stand alone postage scale 12. The scale 12 is adapted to calculate the postage or other transportation charges required to mail or transport an article or parcel. In most instances, such charges are based upon the article weight, class of transportation and, with respect to certain classes, distance to destination or zone. The scale 12 includes a weighing device 14 having a tray or platform adapted to receive the article or parcel to be mailed or transported. The weighing device 14 is interconnected to a main system processor 16. System processor 16 is programmed to compute the requisite postage or other transportation charges for an article placed upon the platform.

The data necessary for the determination of article postage such as destination operands, class of transportation operands, and the like are entered at a keyboard 18 and corresponding signals are transmitted to the system processor 16. Keyboard data and calculated information are indicated at a display 20.

With the weight, class of transportation and destination zone operands entered, the system processor determines the requisite postage by reference to a postage rate chart and zip number to zone number conversion charts stored in PROMs 22 and provides a signal to the display for indicating the calculated amount. A suitable microprocessor for implementation as the system processor 16 is an Intel 8085 processor available from Intel Corporation of Santa Clara, Calif. The foregoing mode of operation of the scale 12 is well known to those skilled in the art and is typically illustrated in U.S. Pat. No. 4,135,662 entitled OPERATOR PROMPTING SYSTEM issued Jan. 23, 1979 to Daniel F. Dlugos and assigned to the assignee of the present invention.

The postage value determining system processor disclosed in U.S. Pat. No. 4,135,662 above was integral with a complete mailing system and transmitted a postage value signal to a meter setting device for setting a postage meter and dispensing the calculated postage. Under the present invention, the scale 12 is constructed as a stand alone unit for use without peripheral devices associated with a complete mailing system, yet maintains versatility for controlling and transmitting data to and receiving data from various peripheral devices including electronic postage meters if a complete mailing system is desired by the user. Accordingly, scale 12 is available at an economical cost because its circuit does not incorporate an interface for communications with mailing systems peripheral devices.

As is described more fully in U.S. Pat. No. 4,410,961 for INTERFACE BETWEEN A PROCESSOR SYSTEM AND PERIPHERAL DEVICES USED IN MAILING SYSTEM and assigned to the assignee of the present invention, a peripheral controller interface 24 is provided as a separate self-contained unit and is adapted to establish communications links between the system processor 16 and various mailing system peripheral devices. In the present invention, the mailing system peripheral devices may include an electronic postage meter 28 which communicates through lines 62 with interface 24 and is adapted to dispense United States Postal Service postage denominations or to dispense private carrier transportation charges for example, those of United Parcel Service.

Electronic postage meters of this general type are described in U.S. Pat. No. 3,978,457 entitled MICROCOMPUTERIZED ELECTRONIC POSTAGE METER SYSTEM issued Aug. 31, 1976 to Frank T. Check, Jr. et al and U.S. Pat. No. 4,301,507 entitled ELECTRONIC POSTAGE METER HAVING PLURAL COMPUTING SYSTEMS issued Nov. 17, 1981 to John H. Soderberg et al, both of which patents are assigned to the assignee of the present invention. Such electronic postage meters may be programmed for communication with the scale system processor 16 pursuant to the communications routine disclosed in the above-noted patents.

Additional mailing system peripheral devices programmed for communication with the main system processor 16 through the peripheral controller interface 24 are an electronic accounting system 30 through lines 63, a computer interface 32 through lines 64 and printer 34 through lines 65. Additionally, a further communications link 36 through lines 70 is provided for communications through an RS 232 standard which interfaces with one or more available RS 232 printers 38 or any other desirable peripheral device communicating in ASCII code, for example. The construction and operation of the peripheral controller interface 24 is described more fully in the above-noted copending application entitled POSTAGE SCALE PERIPHERAL INTERFACE, the specific and entire disclosure of which is incorporated herein by reference.

Figure 2A:
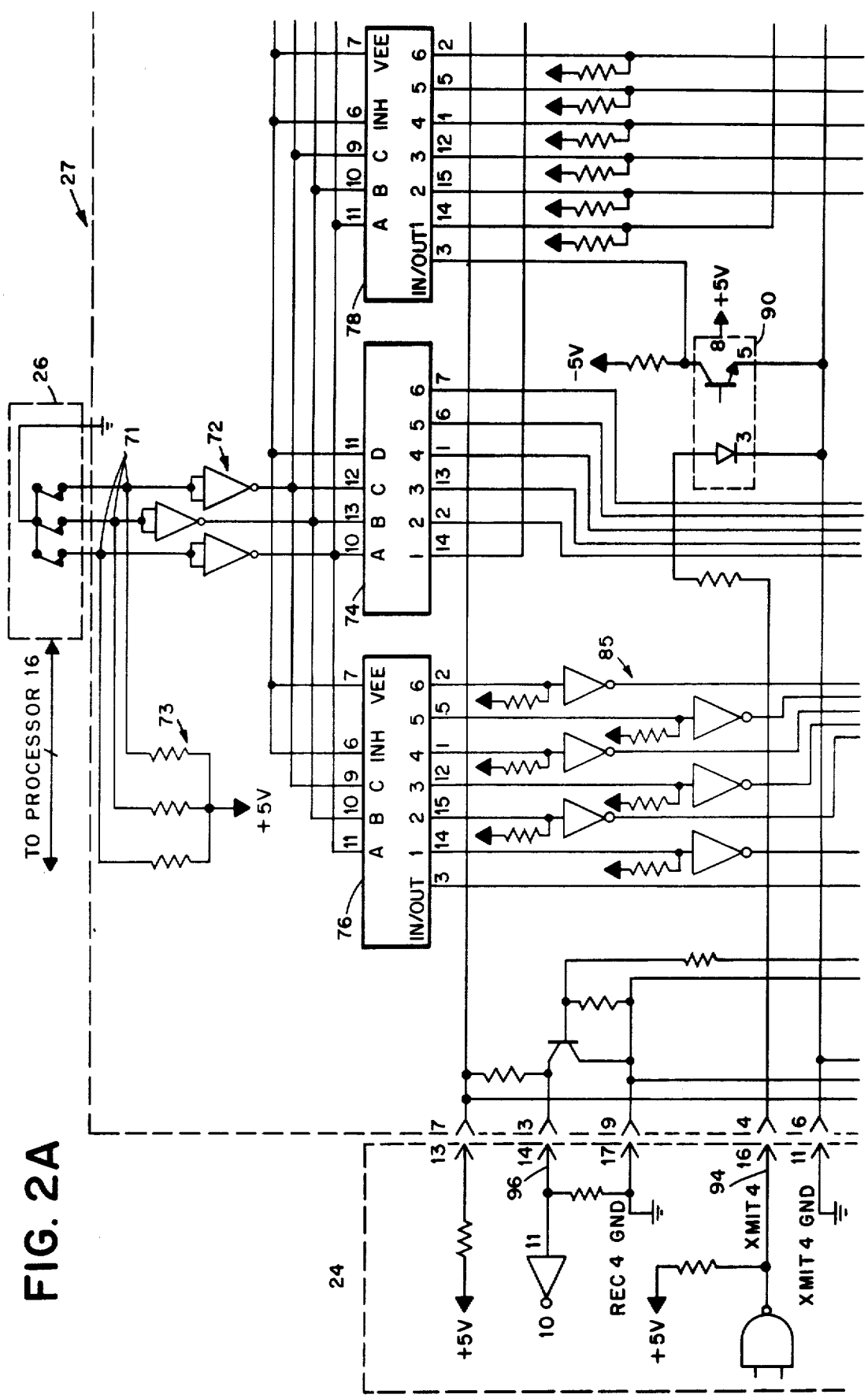
FIG. 2 is an interconnection diagram of FIGS. 2a through 2h which, when taken together, are a schematic illustration of the selector and data steering interface circuit.
Figure 2B:
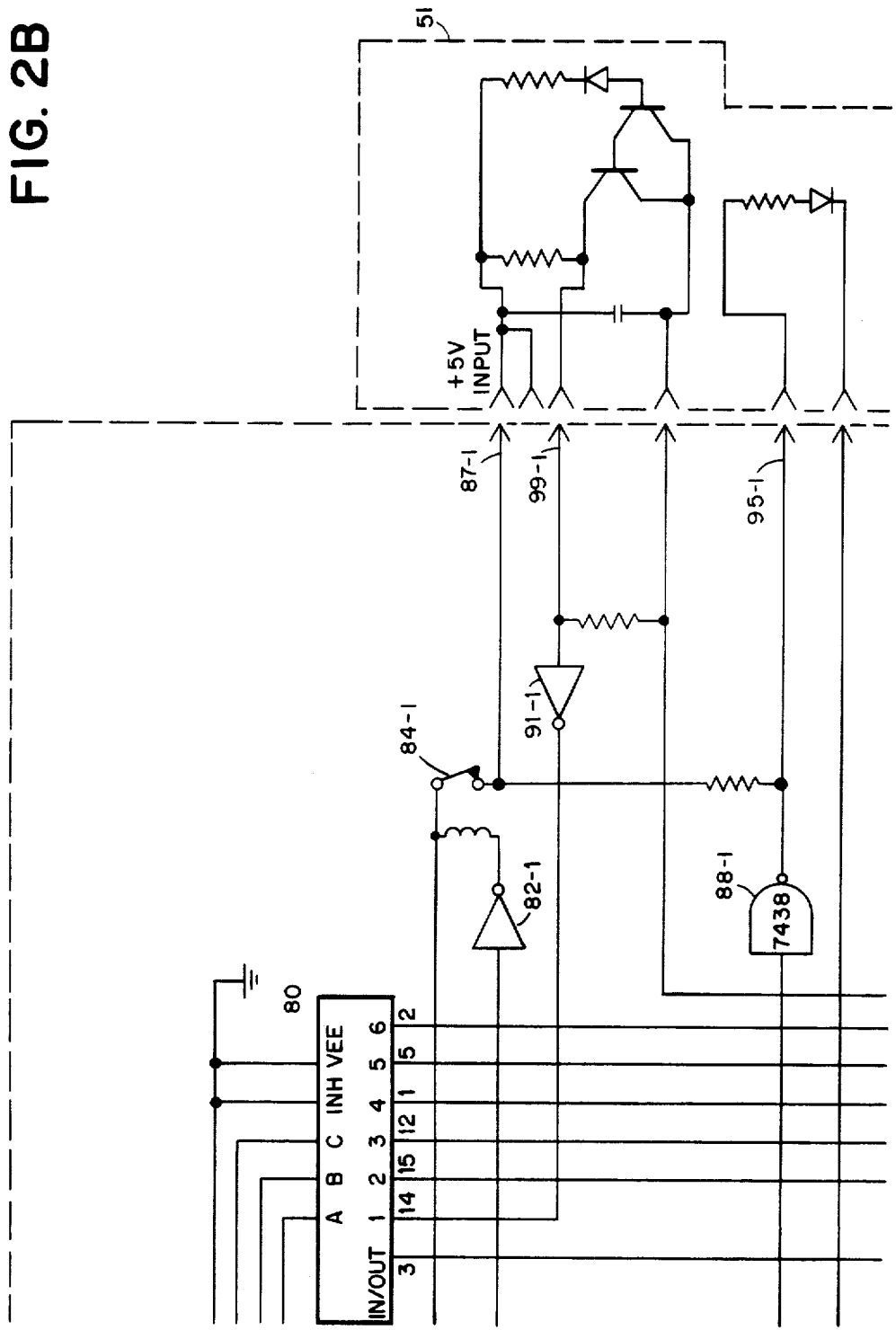
Figure 2C:
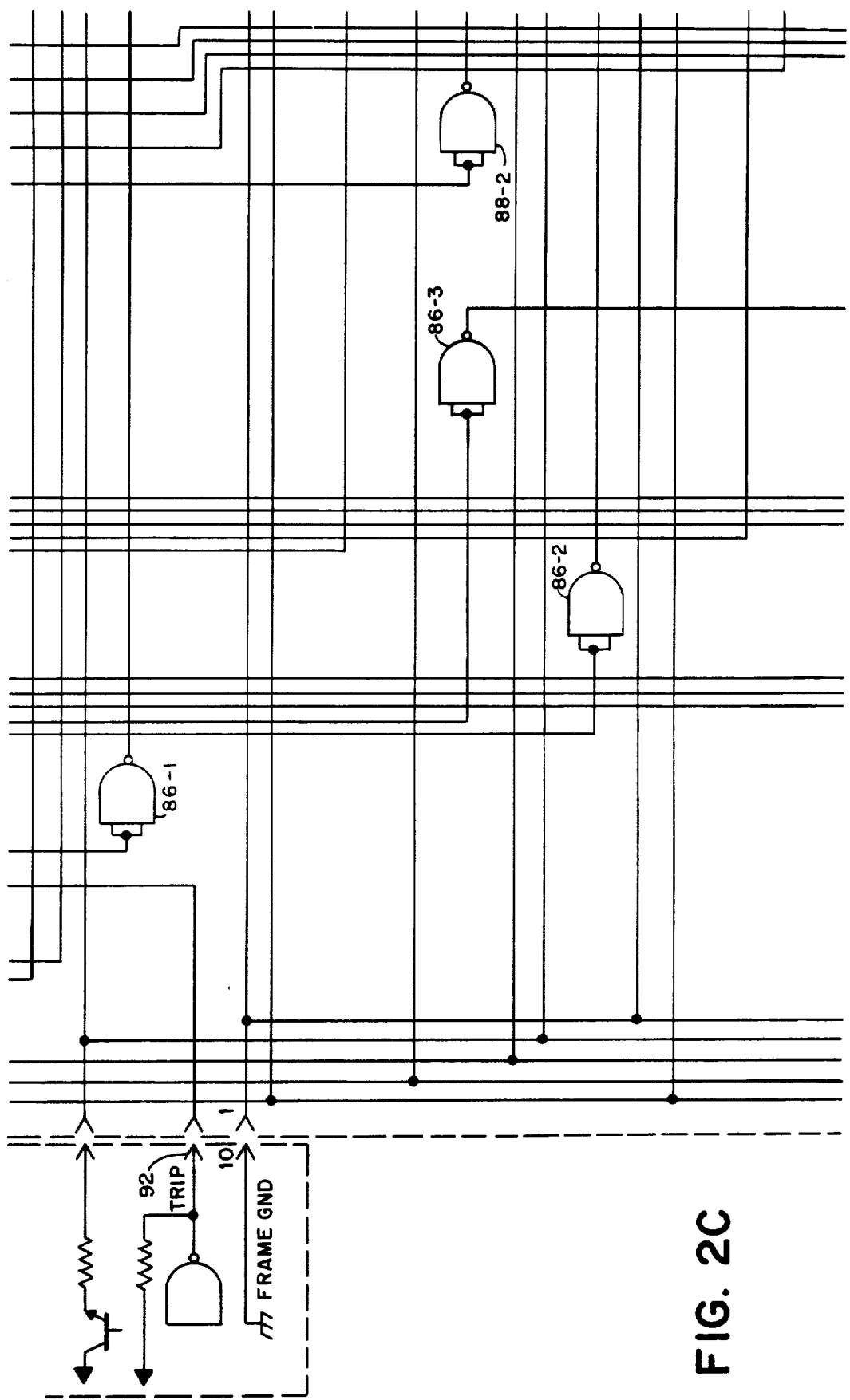
Figure 2E:
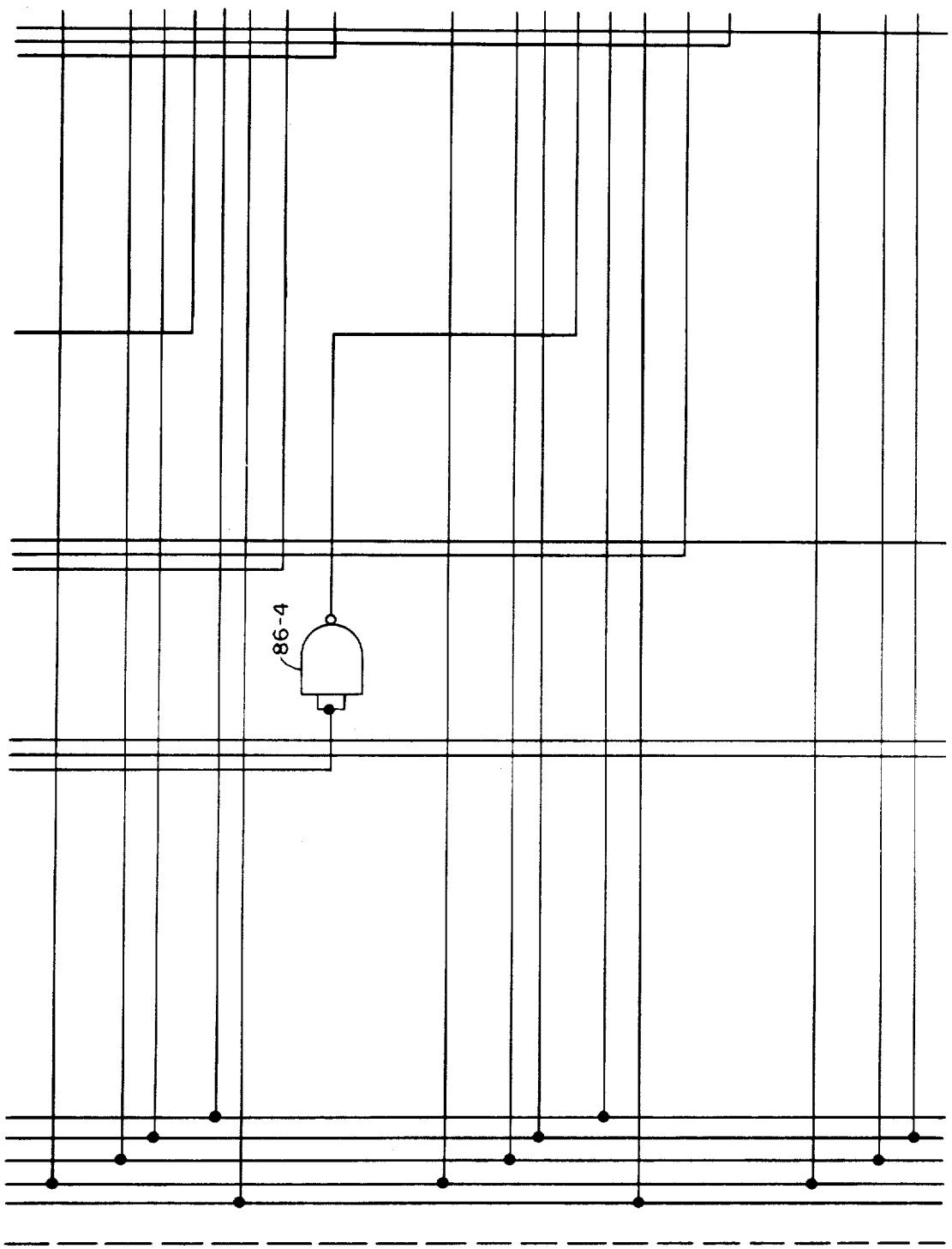
Figure 2F:
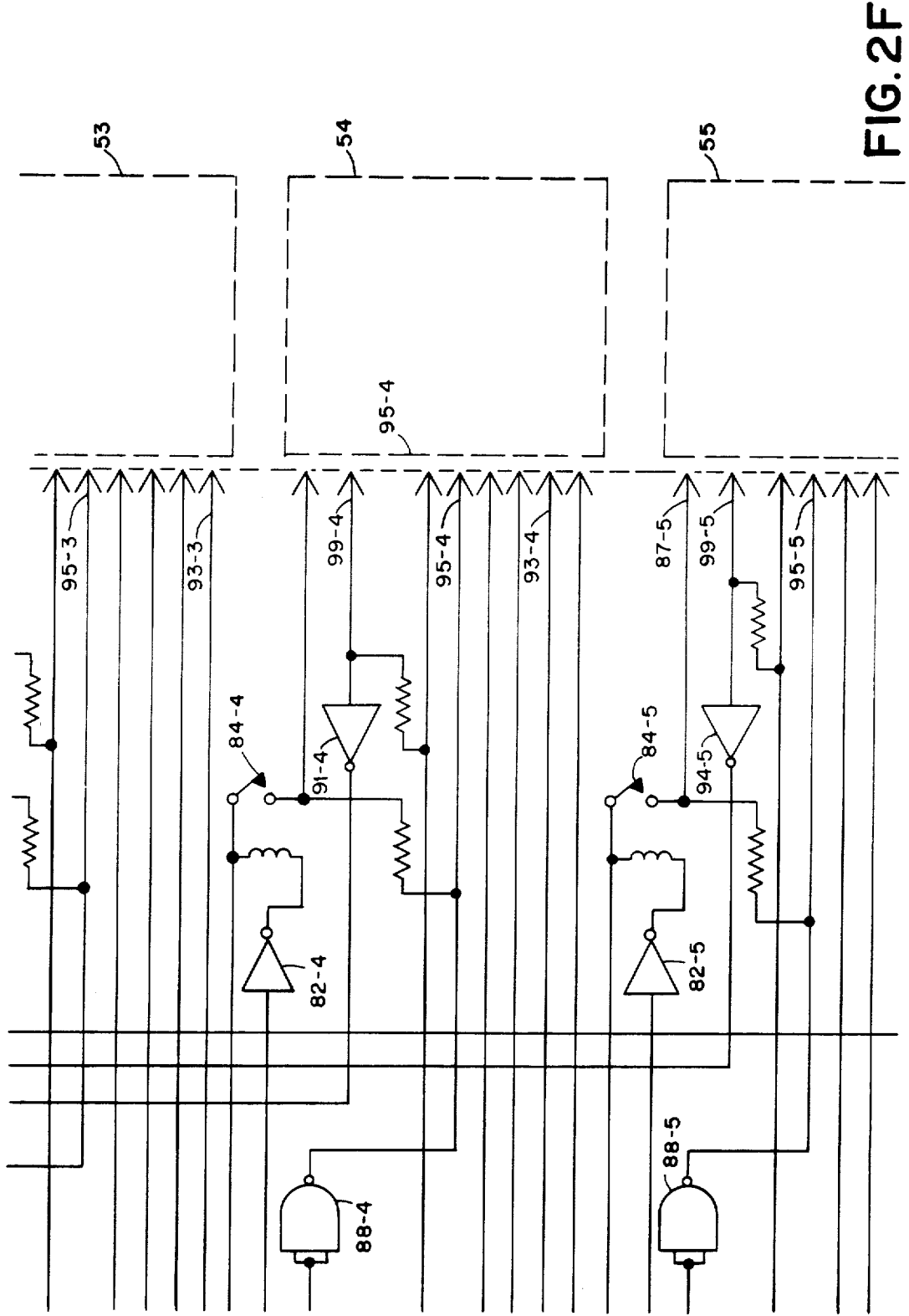
Figure 2G:
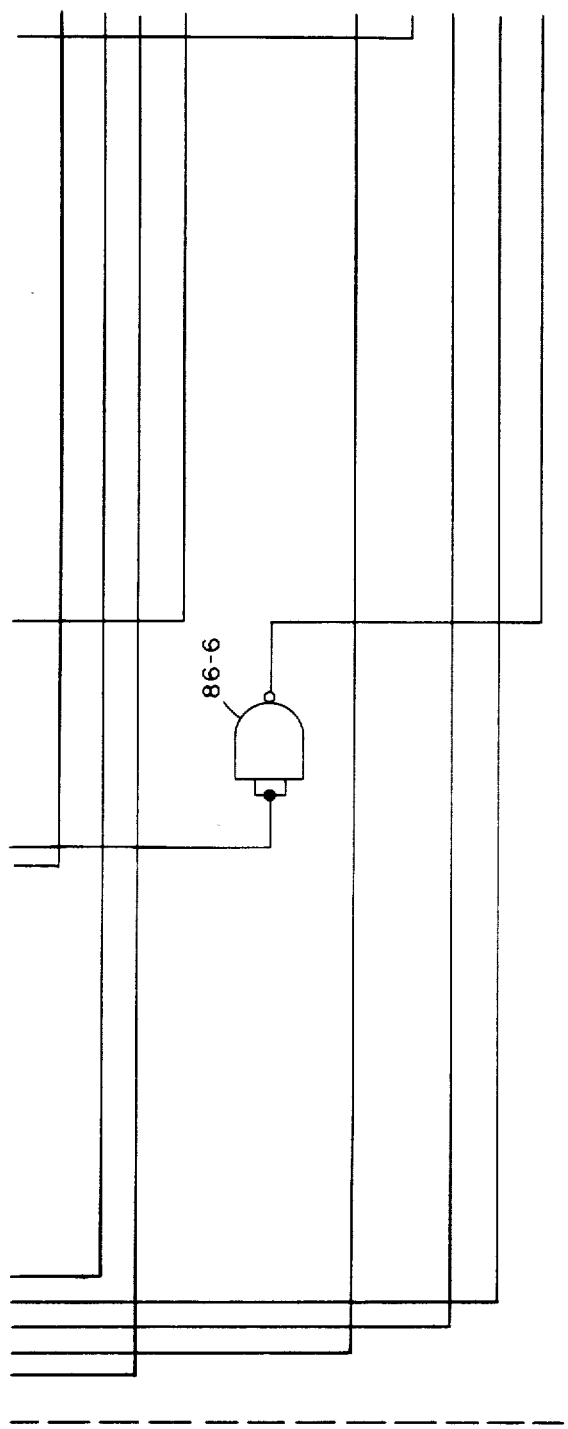
Figure 2H:
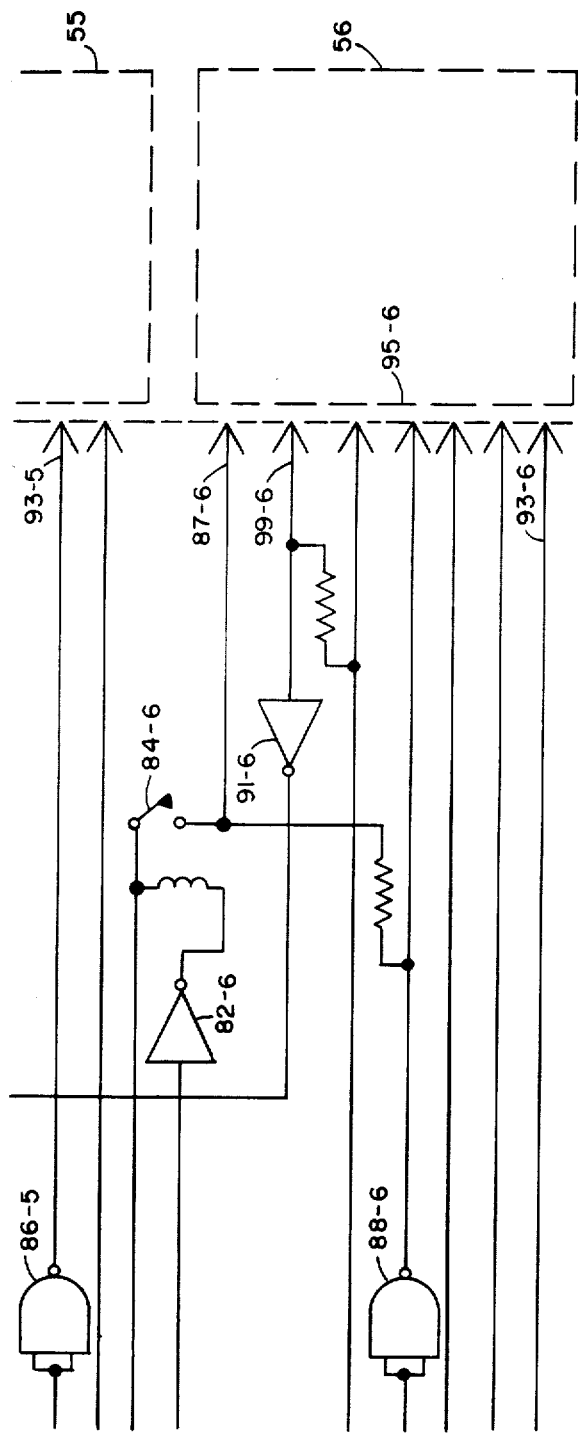

Also communicating with peripheral controller interface 24 through communications lines 60 is a data steering interface 27 which also communicates with an electronic postage meter selector 26 and is further interconnected with electronic postage meters 51, 52, 53, 54, 55 and 56 through communication lines 41, 42, 43, 44, 45 and 46, respectively. Each of the electronic postage meters 51 through 56 are adapted to communicate through peripheral controller interface 24 with system processor 16 and PROMs 22 for access to the specific postal rate charts and zip to zone conversion charts based on mailing from different desired zone distribution points. In addition, each postage meter has the postage denomination indicia and accounting process specific to the desired zone distribution point. The function and operations of the data steering interface 27 and selector 26 will be described more fully in connection with FIG. 2.

Referring now to FIG. 2, there is shown schematically a selector switch 26 interconnected to a data steering interface board shown generally at 27. Switch 26 is a manually operated multiposition switch such as a thumb wheel having an indexed number of positions equal to the number of different electronic postage meters 51 through 56 connected to data steering interface 27. Switch 26 sends a binary coded decimal (BCD) signal over output lines 71 to interface board 27 indicating the selector switch position and thus the peripheral electronic postage meter which it is desired to interconnect through peripheral controller interface 24 with scale system processor 16. In addition, the BCD signal from the switch 26 is communicated to the main processor 16 and PROMs 22 to select the postal rate chart and zip to zone conversion chart appropriate to the desired mail distribution point. The BCD signal is passed through inverters 72 to a BCD to decimal decoder 74. Pull-up resistors 73 are provided on output lines 71 to prevent voltage float. The BCD signal from the inverters 72 is also connected to multiplexers 76, 78 and 80. Decoder 74 and multiplexers 76, 78 and 80 each have six outputs designated 1 through 6, each one of which is connected to a respective one of electronic postage meters 51 through 56. Based on the BCD signal received from switch 26, one of the 1, 2, etc. outputs of the decoder 74 and multiplexer 76, 78 and 80 will be activated.

The decoder 74 outputs are connected through inverters 82-1 through 82-6 to coil relays 84-1 through 84-6 connected to a respective one of meters 51 through 56. Activation of decoder output 1, for example, by the appropriate BCD signal energizes the coil of relay 84-1 to close the relay contact and connect electronic postage meter 1 shown at 51 to a plus 5 volt source at 87-1.

Multiplexer 76 is connected through its IN/OUT port to the trip signal output 92 of controller interface 24 and upon receipt of the appropriate BCD signal from selector switch 26, transmits the trip signal through output 1 of multiplexer 76, through one of inverters 85, NAND gate 86-1, which functions as an inverter, to the trip signal input 93-1 of electronic postage meter 51.

Multiplexer 78 is connected through its IN/OUT port to the data transmit output 94 from interface 24 and upon receipt of the appropriate BCD signal from selector switch 26 indicating selection of meter 51, for example, passes data transmit signals from interface 24 through multiplexer 78, output 1 through NAND gate 88-1, which functions as an inverter, to the respective data received input 95-1 in electronic postage meter 1 shown at 51. It will be noted that the data transmit signals received from interface 24 pass through optoisolator 90 to provide protection against spurious signals. A more detailed description of optoelectronic coupler 90 may be found in the above-noted U.S. Pat. No. 4,301,507.

Multiplexer 80 is connected to the data receive output 96 of interface 24 and upon receipt of the appropriate BCD signal indicating selection of meter 51, connects the data transmit output 99-1 of electronic postage meter 1 shown at 51 through an inverter 91-1 through its port 1, and its IN/OUT port to the interface 24 at 96.

The foregoing description assumes that a selection of meter 51 has been made. It will be understood that the circuit for meters 52-56 are identical to meter 51 and that appropriate selection producing BCD signals to decoder 74 and multiplexers 76, 78 and 80 will similarly interconnect the respective outputs corresponding to meters 52-56. Multiplexers 76, 78 and 80 may be CMOS analog multiplexers such as the 4051 available from RCA Corporation while decoder 74 may be a CMOS BCD to decimal decoder such as the 4028 also available from RCA Corporation.

As discussed above, it will be understood that the BCD signal output from switch 26 is also connected through a logic circuit not shown through controller interface 24, to scale 16 to permit the selection of the appropriate PROM 22 containing the postage rate chart and zip number to zone number conversion chart based on the zone distribution point desired.

From the foregoing description, it can be seen that a system has been provided in which a data steering board 27 upon receipt of an appropriate selection signal from selector switch 26 interconnects the data transmit, data receive and command including trip signal lines contained in a selected one of electronic postage meters 51 through 56 through an interface controller 24 to the system processor 16 of scale 12. A more detailed description of the communications link between the peripheral interface controller 24 and the electronic postage meters 51 through 56 as well as the program control may be obtained by referring to the abovenoted copending patent application entitled POSTAGE SCALE PERIPHERAL INTERFACE as well as U.S. Pat. No. 4,271,470.

It should be understood that as employed herein, the terms mail and postage relate not only to governmental postal services and charges for such services, but also to non-governmental transport services including common carriers and private carriers such as United States Parcel Service and the transportation charges and fees imposed by such entities.

Further, the term "data" should be considered as including more than numeric data but, in addition, any information exchanged between the peripheral mailing devices and the system processor including commands such as set and trip as well as status indicators.

As various changes may be made in the data steering interface and selector mailing system as set forth herein, it is to be understood that all matter herein described as shown in the accompanying drawings is to be interpreted as illustrative and not in a limiting sense.

What is claimed is:

1. A mailing system comprising, in combination, a scale including weighing means for determining weights, data entry means for entering postage value determining data, and processor means responsive to the weights and the postage value determining data for determining postage values; a plurality of electronic postage meters for dispensing postage denominations for mail service, each postage meter adapted to dispense postage denominations for mailing from a selected different postal zone distribution point; a data steering interface for establishing an interconnection between the postage value determining processor and a selected one of said postage meters; and selector means for operator input of a postage meter selection signal for selecting one of the plurality of postage meters, the selector means being interconnected with the data steering interface for directing the data steering interface to establish an interconnection with the selected postage meter.

2. A mailing system as set forth in claim 1 wherein the selector means comprises a manually operated switch for providing the postage selection signal to the data steering interface, the selection signal indicating the desired one of said postage meters.

3. A mailing system as set forth in claim 2 wherein the selector means includes a thumb wheel switch and the postage meter selection signal provided by the switch is a digital signal in binary coded decimal form.

4. A mailing system as set forth in claim 2 wherein the data steering interface includes a decoder for receiving the postage meter selection signal provided by the selector means, the decoder being connected to the electronic postage meters through relays whereby receipt of the meter selection signal activates one of the relays to connect the desired one of said electronic postage meters to a voltage source.

5. A mailing machine as set forth in claim 1 wherein the scale includes a PROM containing postage rate and zip to zone conversion data and the selector means is in communication with the PROM for selection of the postage rate and zip to zone conversion data desired based on the desired zone distribution point.

6. A mailing system as set forth in claim 1 wherein the data steering interface includes multiplexer means connected to the selector for establishing a data communications link between the postage value determining processor and the postage meter selected by the selector means.

7. A mailing system as set forth in claim 6 wherein the data steering interface includes an interconnection with data transmit and data receive lines from the processor and the multiplexer means connects the data transmit and data receive lines from the processor to the postage meter selected by the selector means.

8. A mailing system as set forth in claim 6 wherein a peripheral controller interface provides the data communications link between the postage value determining processor and the data steering interface.

9. A mailing system as set forth in claim 8 wherein the data communications link includes data transmit, data receive and command lines, and the multiplexer means includes a first multiplexer for interconnecting the data transmit line with the selected postage meter, a second multiplexer for connecting the data receive line with the selected postage meter and a third multiplexer for connecting the command line with the selected meter.

10. A mailing system as set forth in claim 1 wherein the postage meters include a postage denomination printer bearing indicia indicating the selected postal zone distribution point.

* * * * *